United States Patent
Ito et al.

(10) Patent No.: US 11,397,248 B2
(45) Date of Patent: Jul. 26, 2022

(54) SENSING SYSTEM AND DRIVING SUPPORT SYSTEM

(71) Applicant: Panasonic Intellectual Property Management Co., Ltd., Osaka (JP)

(72) Inventors: Junji Ito, Osaka (JP); Kazunari Takahashi, Shiga (JP); Kouji Shimomura, Kyoto (JP); Susumu Fukushima, Osaka (JP)

(73) Assignee: NUVOTON TECHNOLOGY CORPORATION JAPAN, Kyoto (JP)

(*) Notice: Subject to any disclaimer, the term of this patent is extended or adjusted under 35 U.S.C. 154(b) by 485 days.

(21) Appl. No.: 15/347,083

(22) Filed: Nov. 9, 2016

(65) Prior Publication Data
US 2017/0052257 A1 Feb. 23, 2017

Related U.S. Application Data

(63) Continuation of application No. PCT/JP2015/002678, filed on May 27, 2015.

(30) Foreign Application Priority Data

May 30, 2014 (JP) .............................. JP2014-112895

(51) Int. Cl.
*G01S 7/48* (2006.01)
*G01S 7/484* (2006.01)
(Continued)

(52) U.S. Cl.
CPC ............ *G01S 7/484* (2013.01); *G01S 7/4863* (2013.01); *G01S 17/10* (2013.01); *G01S 17/86* (2020.01);
(Continued)

(58) Field of Classification Search
None
See application file for complete search history.

(56) References Cited

U.S. PATENT DOCUMENTS 7,375,803 B1 * 5/2008 Bamji .................. G01S 7/4816
356/4.01
9,315,192 B1 * 4/2016 Zhu ...................... G06K 9/6217
(Continued)

FOREIGN PATENT DOCUMENTS

| CN | 101130353 A | 2/2008 |
| CN | 100401129 C | 7/2008 |

(Continued)

OTHER PUBLICATIONS

English Translation of Chinese Search Report dated Sep. 3, 2018 for the related Chinese Patent Application No. 201580027457.4.
(Continued)

*Primary Examiner* — Hovhannes Baghdasaryan
(74) *Attorney, Agent, or Firm* — McDermott Will & Emery LLP

(57) ABSTRACT

Provided is a sensing system that performs set control with high sensing accuracy. The sensing system that outputs an object signal includes a solid-state imaging device that senses a first physical target from an object and a second physical target different from the first physical target, and an arithmetic operation unit that calculates an object signal using a first signal from the first physical target and a second signal from the second physical target. The arithmetic operation unit calculates an object signal using a reference signal from a device mounted with the sensing system.

14 Claims, 14 Drawing Sheets

(51) Int. Cl.
*G01S 17/10* (2020.01)
*G01S 7/4863* (2020.01)
*G01S 17/87* (2020.01)
*G01S 17/86* (2020.01)
*G01S 17/931* (2020.01)
*G01S 17/894* (2020.01)
*G01S 17/58* (2006.01)

(52) U.S. Cl.
CPC ............ *G01S 17/87* (2013.01); *G01S 17/894* (2020.01); *G01S 17/931* (2020.01); *G01S 7/4802* (2013.01); *G01S 17/58* (2013.01)

(56) References Cited

U.S. PATENT DOCUMENTS

| | | | |
|---|---|---|---|
| 2002/0149694 A1* | 10/2002 | Seo | H04N 9/04557 348/370 |
| 2004/0118624 A1* | 6/2004 | Beuhler | G01S 17/58 180/167 |
| 2005/0270784 A1 | 12/2005 | Hahn et al. | |
| 2008/0043887 A1 | 2/2008 | Aoki et al. | |
| 2008/0122933 A1 | 5/2008 | Murayama | |
| 2008/0297374 A1 | 12/2008 | Usami | |
| 2014/0042325 A1 | 2/2014 | Yamamura | |
| 2014/0229069 A1* | 8/2014 | Akiyama | B60T 7/12 701/41 |
| 2014/0350836 A1* | 11/2014 | Stettner | G01S 17/023 701/301 |

FOREIGN PATENT DOCUMENTS

| | | |
|---|---|---|
| JP | 5-296766 | 11/1993 |
| JP | 3-339498 | 12/1996 |
| JP | 11-306498 A | 11/1999 |
| JP | 2001-008195 | 1/2001 |
| JP | 2001-091619 | 4/2001 |
| JP | 2004-123061 | 4/2004 |
| JP | 2005-001467 A | 1/2005 |
| JP | 2006-516507 | 7/2006 |
| JP | 2006-202047 A | 8/2006 |
| JP | 2008-008700 | 1/2008 |
| JP | 2008-252327 A | 10/2008 |
| JP | 2008-299538 A | 12/2008 |
| JP | 2012-224317 A | 11/2012 |
| WO | 2015/075926 | 5/2015 |

OTHER PUBLICATIONS

International Search Report of PCT application No. PCT/JP2015/002678 dated Jul. 7, 2015.

Office Action with an English translation of the Search Report dated Dec. 20, 2021, issued for the corresponding Chinese Patent Application No. 201910573744.5.

* cited by examiner

FIG. 2A

| First light pixel | First light pixel | First light pixel | First light pixel |
|---|---|---|---|
| Second light pixel | First light pixel | Second light pixel | First light pixel |
| First light pixel | First light pixel | First light pixel | First light pixel |
| Second light pixel | First light pixel | Second light pixel | First light pixel |

FIG. 2B

| Passive light pixel | Passive light pixel | Passive light pixel | Passive light pixel |
|---|---|---|---|
| Active light pixel | Passive light pixel | Active light pixel | Passive light pixel |
| Passive light pixel | Passive light pixel | Passive light pixel | Passive light pixel |
| Active light pixel | Passive light pixel | Active light pixel | Passive light pixel |

FIG. 2C

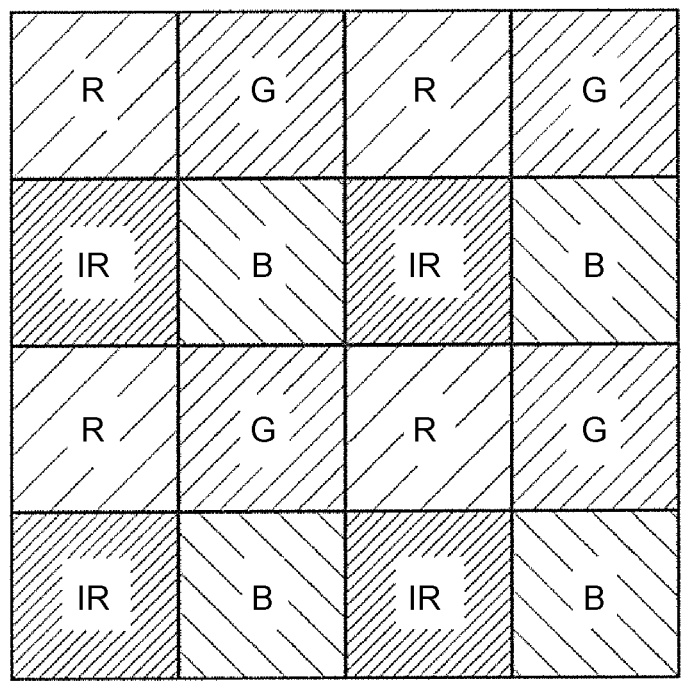

FIG. 2D

| Pixel for both passive light and active light | Pixel for both passive light and active light | Pixel for both passive light and active light | Pixel for both passive light and active light |
|---|---|---|---|
| Pixel for both passive light and active light | Pixel for both passive light and active light | Pixel for both passive light and active light | Pixel for both passive light and active light |
| Pixel for both passive light and active light | Pixel for both passive light and active light | Pixel for both passive light and active light | Pixel for both passive light and active light |
| Pixel for both passive light and active light | Pixel for both passive light and active light | Pixel for both passive light and active light | Pixel for both passive light and active light |

SENSING SYSTEM AND DRIVING SUPPORT SYSTEM

BACKGROUND

1. Technical Field

The present disclosure relates to a sensing system and a driving support system.

2. Description of the Related Art

There have been proposed various sensing systems (imaging systems) that learn object information.

For example, imaging system 140 of a conventional technique disclosed in PTL 1 includes, as shown in FIG. 10, controller 141, IR light emitter 142, lens 143, solid-state imaging device 110, timing generator (TG) 144, signal processor 145, and memory 146. Controller 141 integrally controls respective parts. IR light emitter 142 emits infrared (IR) light toward an object. Lens 143 condenses object light and allows the object light to enter solid-state imaging device 110. Timing generator 144 generates various driving pulses for driving solid-state imaging device 110. Signal processor 145 processes an imaging signal output from solid-state imaging device 110 and calculates a visible light image and an IR image. Memory 146 records the visible light image and the IR image calculated by signal processor 145.

According to PTL 1, there can be provided imaging system 140 having solid-state imaging device 110 that is capable of receiving visible light and IR light in a single-plate configuration and is capable of controlling an exposure time of IR light independently from an exposure time of visible light without a shutter device.

CITATION LIST

Patent Literature

PTL 1: Unexamined Japanese Patent Publication No. 2008-8700

SUMMARY

However, imaging system 140 of the conventional technique disclosed in PTL 1 is a so-called stand-alone system (a visible light image and a distance image (an IR image) calculated by solid-state imaging device 110 are recorded in memory 146), and has a problem that sensing performance is low.

In view of the above problem, a sensing system and a driving support system that have high sensing accuracy and make setting control are provided.

In order to solve the above problem, the sensing system according to one aspect of the present disclosure is a sensing system that outputs an object signal. The sensing system includes a sensor element that senses a first physical target and a second physical target different from the first physical target from an object, and an arithmetic operation unit that calculates an object signal using a first signal calculated based on the first physical target and a second signal calculated based on the second physical target. The arithmetic operation unit calculates an object signal using a reference signal from a device mounted with the sensing system.

Further, in the sensing system according to one aspect of the present disclosure, the device is a transportation device. The reference signal may be at least one of (a) position information of the transportation device, (b) cloud information, and (c) motion information or operation information of the transportation device.

Further, in the sensing system according to one aspect of the present disclosure, the cloud information may be at least one of (b1) map information in a horizontal direction and/or a vertical direction, and (b2) environmental information of a travelling place or a scheduled travelling place.

Further, in the sensing system according to one aspect of the present disclosure, the motion information or operation information of the transportation device is at least one of (c1) information about a travelling speed, a travelling acceleration, and stop of the transportation device, (c2) operation information of the transportation device, (c3) load balance information of the transportation device, and (c4) information about a load balance of the transportation device.

Further, in the sensing system according to one aspect of the present disclosure, the operation information of the transportation device may be at least one of (c21) stepping information of an accelerator pedal and a brake pedal, and (c22) gear position information of transmission.

Further, in the sensing system according to one aspect of the present disclosure, the sensing system selectively outputs an object signal to the device. When the sensing system does not output the object signal, the sensing system may delete, temporarily record, or temporarily store the object signal.

Further, in the sensing system according to one aspect of the present disclosure, the arithmetic operation unit may calculate at least one object signal of (d) detection and recognition of an object or a specific object, (e) a distance to the object or the specific object, (f) a dimension of the object or the specific object, (g) a shape of the object or the specific object, (h) a speed of the object or the specific object, and (i) arithmetic operation inoperability.

Further, in the sensing system according to one aspect of the present disclosure, the arithmetic operation unit may execute at least one of (j) a noise subtracting process, (k) a video magnifying and definition heightening process or a super-resolution process, (l) a high dynamic range process, (m) a signal compression process, and (n) an output determination process for a part or whole of the object signal.

Further, in the sensing system according to one aspect of the present disclosure, the first physical target may be visible light, and the second physical target may be IR light.

Further, in the sensing system according to one aspect of the present disclosure, the first physical target may be passive light from the object or the specific object, and the second physical target may be active light from the object or the specific object.

Further, in the sensing system according to one aspect of the present disclosure, the sensing system may calculate an object signal according to a time of flight operation using the active light.

Further, in the sensing system according to one aspect of the present disclosure, the sensing system may compare a current frame with a previous frame using the passive light so as to calculate an object signal.

Further, in the sensing system according to one aspect of the present disclosure, the sensing system includes a signal generator that generates a light emission signal for instructing light emission and an exposure signal for indicating exposure, and a pulse light source that emits pulse light according to the light emission signal. The sensor element is a single-plate solid-state imaging device, and the solid-state imaging device may perform exposure and imaging according to the exposure signal.

Further, in the sensing system according to one aspect of the present disclosure, the sensing system selects a first signal or a second signal according to a state of sensing environment so as to calculate an object signal. Alternatively, one of the first signal and the second signal may be corrected by the other one of the first signal and the second signal so that an object signal may be calculated.

Further, in the sensing system according to one aspect of the present disclosure, the sensing system selects the first signal or the second signal based on storage information or recording information of the sensing system so as to calculate an object signal. Alternatively, one of the first signal and the second signal may be corrected by the other one of the first signal and the second signal so that an object signal may be calculated.

Further, the driving control system according to one aspect of the present disclosure includes the sensing system according to one aspect of the present disclosure, and a set controller that controls the device using the object signal from the sensing system.

Further, in the driving control system according to one aspect of the present disclosure, the sensing system may be a main sensing system having the driving control system. The driving control system may include at least one sub-sensing system.

Further, in the driving control system according to one aspect of the present disclosure, when the sub-sensing system outputs a sub-object signal, the sub-sensing system may give information when the main sensing system determines output of a main object signal.

Further, in the driving control system according to one aspect of the present disclosure, the device is a transportation device, and the control of the device may be at least one of (a) automatic brake control during travelling of the device, (b) automatic start-stop control while the device stops, (c) emergency brake signal control, (d) automatic steering control, and (e) automatic driving operation control.

Further, in the driving control system according to one aspect of the present disclosure, the driving control system may include information acquirer for outputting an information signal.

The sensing system and the driving control system according to one aspect of the present disclosure ensures high sensing accuracy and set control.

BRIEF DESCRIPTION OF THE DRAWINGS

FIG. 2A is a plan structural view illustrating a configurational example of a solid-state imaging device (an image sensor) to be mounted to the sensing system and the driving support system according to the basic configuration of the exemplary embodiments;

FIG. 2B is a plan structural view illustrating the solid-state imaging device (the image sensor) to be mounted to the sensing system and the driving support system according to the basic configuration of the exemplary embodiments;

FIG. 2C is a plan structural view illustrating the solid-state imaging device (the image sensor) to be mounted to the sensing system and the driving support system according to the basic configuration of the exemplary embodiments;

FIG. 2D is a plan structural view illustrating the solid-state imaging device (the image sensor) to be mounted to the sensing system and the driving support system according to the basic configuration of the exemplary embodiments;

DETAILED DESCRIPTION

A sensing system and a driving support system (an operation support system) according to exemplary embodiments of the present disclosure will be described below with reference to the drawings. The following exemplary embodiments illustrate concrete examples of the present disclosure, and thus numerical values, shapes, materials, components, dispositions and connection forms of the components are merely examples and do not limit the present disclosure.

Further, expressions such as (a), (b), (c) used in the following description as examples include a case of at least one of them and a case where at least two of them are combined.

Further, the following description will refer to mainly an automobile (a transportation device) as a set (a device) to be mounted with the sensing system or the driving support system (the operation support system) according to the exemplary embodiments of the present disclosure. However, the type of the set is not limited to an automobile. The set can be mounted to various devices such as another transportation device (e.g., a bicycle, a motorcycle, a railroad vehicle, an airplane, or a spacecraft), a transportation device and infrastructure equipment, a heavy machine (e.g., a loading shovel, or a bulldozer), a housing installation apparatus, or an information communication terminal.

Further, in the following description, the sensing system or the driving support system (the operation support system) according to the exemplary embodiments of the present disclosure is mainly used for a sensing application outside an automobile (a transportation device). However, the system can be used for a sensing application inside a vehicle (for example, sensing for prevention of driver's (i.e., object, specific object) dozing, prevention of inattentive driving, or the like).

Basic Configuration of Exemplary Embodiments

Figure 1:
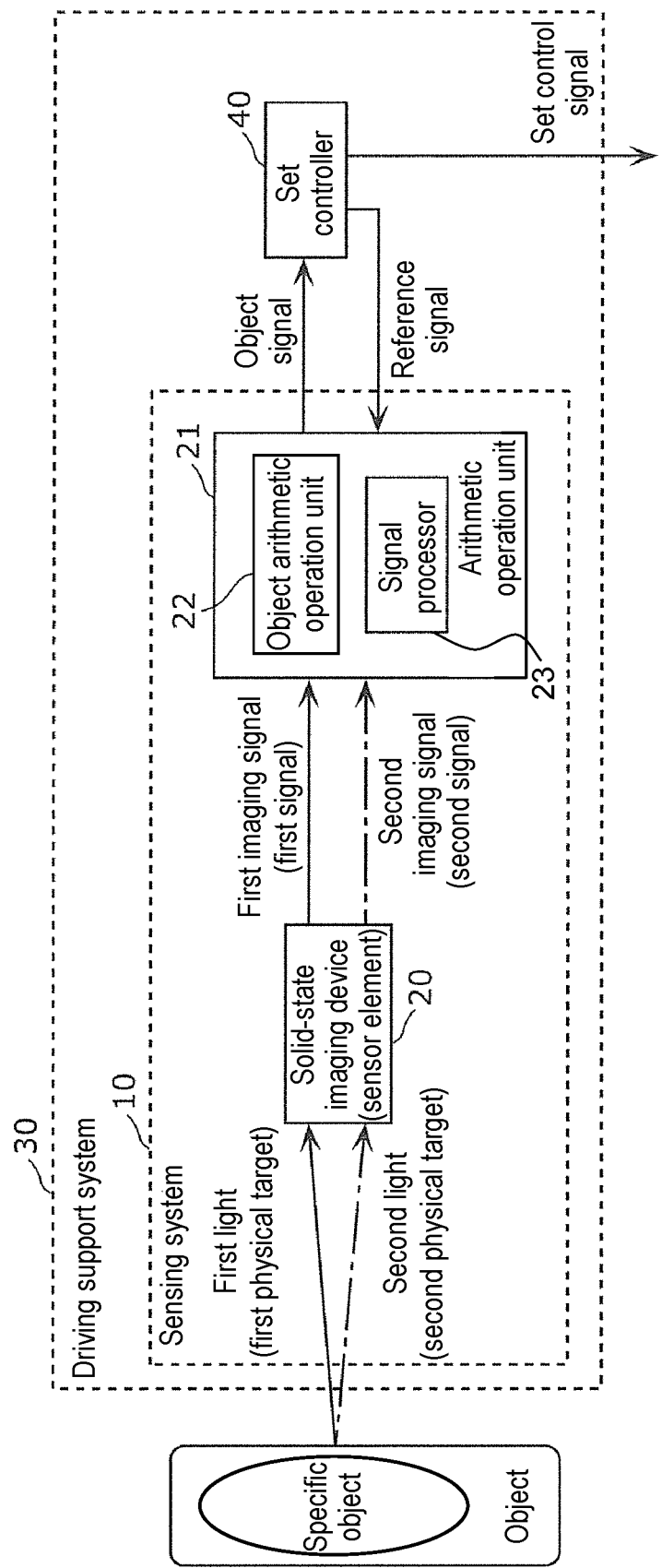
FIG. 1 is a functional block diagram illustrating a summary of a basic configurational example of a sensing system and a driving support system according to a basic configuration of exemplary embodiments.

FIG. 1 is a functional block diagram illustrating a summary of a basic configuration example of sensing system 10 or driving support system (operation support system) 30 according to a basic configuration of the exemplary embodiments.

As shown in FIG. 1, sensing system 10 includes solid-state imaging device (image sensor, sensor element) 20, and arithmetic operation unit 21. Solid-state imaging device 20 performs imaging (sensing) using incident first light (a first physical target) and second light (a second physical target), and outputs a first imaging signal (a first signal) from the first light, and a second imaging signal (a second signal) from the second light. Here, the physical target is, for example, light, a radio wave (radar), a sound, a pressure, a heat, or the like.

Further, examples of the first light and the second light that are received by solid-state imaging device 20 will be described below. (a) The first light and the second light may be light in different wavelength regions. For example, the first light may be light in a visible region, and the second light may be in a region other than the visible region (for example, wavelength light in an IR region). (b) The first light may be normal object light from outside light such as sunlight or indoor light, in other words, radiated light that is not caused by irradiation active light but is emitted from an object. Further, the second light may be reflected light (reflected active light) of irradiation active light from pulse light source 25, which will be described later. Details of passive light and reflected active light will be described later.

The first light and the second light are not limited to the above examples. For example, the first light may be passive light of visible region light, and the second light may be reflective active light of IR region light. Further, the first physical target and the second physical target do not have to be light, and may be a heat, a radar or the like.

FIG. 2A to FIG. 2D are plan structural views of configurational examples of solid-state imaging device 20 according to the basic configuration of the exemplary embodiments.

As shown in FIG. 2A, solid-state imaging device 20 includes pixels (first light pixels) that receive the first light, and pixels (second light pixels) that receive the second light.

Further, a case where the first pixels receive passive light and the second pixels receive reflected active light will be described in detail with reference to the drawings. As shown in FIG. 2B, solid-state imaging device 20 may include pixels that receive passive light (hereinafter referred to as passive light pixels) as the first light pixels, and pixels that receive reflected active light (hereinafter referred to as active light pixels) as the first light pixels.

FIG. 2C is a plan structural view illustrating one concrete example of the solid-state imaging device shown in FIG. 2B. As shown in FIG. 2C, solid-state imaging device 20 may include pixels provided with filters for transmitting R (Red), G (Green), and B (Blue) light as the passive light pixels, and pixels provided with a filter for transmitting infrared (IR) light as the active light pixels. That is, when solid-state imaging device 20 shown in FIG. 2C is mounted to sensing system 10, the active light pixels can receive IR light that is light other than visible light.

FIG. 2D is a plan structural view illustrating a modified example of the solid-state imaging device shown in FIG. 2A. In this exemplary embodiment, solid-state imaging device 20 does not have the configuration in FIG. 2B or FIG. 2C. As shown in FIG. 2D, solid-state imaging device 20 may include pixels (pixels for both passive light and active light) that serve as both the passive light pixels and the active light pixels. In other words, the passive light pixels may further receive reflected active light, and the active light pixels may further receive passive light. In this case, because solid-state imaging device 20 can receive passive light and reflected active light, a light receiving area (a pixel area) in solid-state imaging device 20 becomes large so that high-sensitivity imaging (high-sensitivity photographing) is possible.

Further, in the passive light pixels, the R, G, and B pixels receive passive light through filter transmission. Specifically, a first imaging signal is output as an R component, a G component and a B component to the R, G, and B pixels. On the other hand, the IR pixels receive reflected active light, and output the second imaging signal.

In the passive light pixels, an IR cut filter may be mounted to the R, G, and B filters.

Further, in the passive light pixels, the R, G, and B filters may be formed by R+IR, G+IR, B+IR, and IR filters. In this case, IR light included in the passive light can be also received. In other words, R+IR, G+IR, and B+IR pixels can receive an R component and a part of the IR component, a G component and a part of the IR component, and a B component and a part of the IR component, and can output a first imaging signal. That is, in this case, when the passive light pixels receive the passive light, a visible light image can be captured, and an IR image that can be captured even in darkness, for example, can be also captured.

Figure 2E:
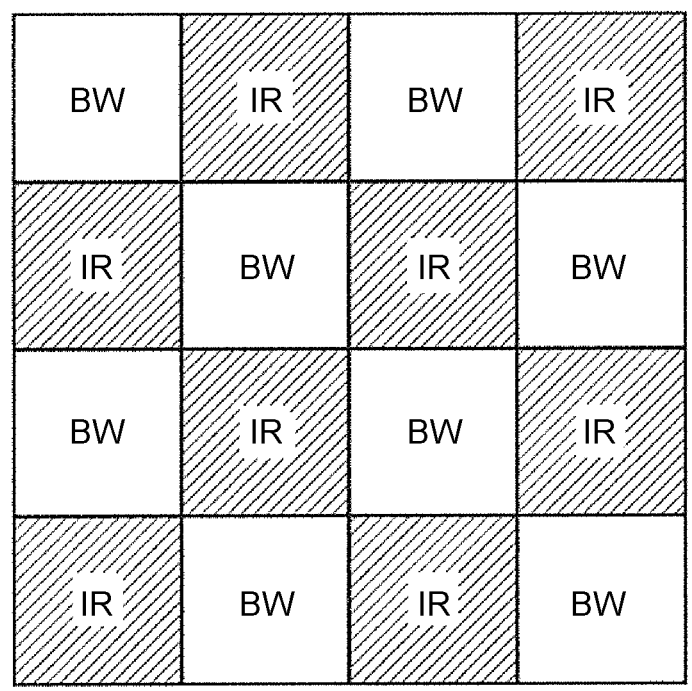
FIG. 2E is a plan structural view illustrating the solid-state imaging device (the image sensor) to be mounted to the sensing system and the driving support system according to the basic configuration of the exemplary embodiments.

As shown in FIG. 2E, the passive light pixels forming solid-state imaging device 20 do not have to be provided with R, G, and B filters. In this case, solid-state imaging device 20 can capture a monochrome (BW) image.

Further, the passive light pixels may have a pixel structure where color images can be formed without filters (for example, the depth of an impurity region forming pixels (photodiodes) may be changed, or the type or density of an impurity may be changed).

Further, the dispositions, pixel ratios and light receiving areas of the passive light pixels and the active light pixels are not limited to the above examples. For example, the unit area of the active light pixels may be set to be larger than that of the passive light pixels, and the pixel count of the passive light pixels may be larger than that of the active light pixels.

Further, the active light pixels may have a pixel structure where reflected passive light can be exposed without forming filters (for example, the depth of an impurity region forming pixels (photodiodes) may be changed, or the type or density of an impurity may be changed).

Operation unit 21 included in sensing system 10 will be described in detail again with reference to FIG. 1.

Arithmetic operation unit 21 includes object arithmetic operation unit 22 and signal processor 23, and receives a reference signal from a set side. Details of the reference signal will be described later.

Object arithmetic operation unit 22 is a unit that performs an arithmetic operation for sensing an object (or a specific object that is an important part of the object). Object arithmetic operation unit 22 calculates an object signal as information about the object using the first imaging signal, the second imaging signal, and the reference signal. Examples of the information about the object include (a) detection of the specific object, i.e., detection of the specific object in the object, (b) recognition of the object or recognition of the specific object, i.e., recognition of what the object or the specific object is like, and (c) calculation of the distance to the specific object (or the object), the dimension of the specific object (or the object), the shape of the specific object (or the object), the speed of the specific object (or the object).

The number of the specific objects is not limited to one, and may be a plurality and/or plural kinds of specific objects.

Further, in order to calculate the object signal, object arithmetic operation unit 22 can arithmetically operate and calculate the object signal independently using the first imaging signal and the second imaging signal, and can arithmetically operate and calculate the object signal depending on each situation. Examples of the situation include (a) a case where a part of the second imaging signal is used to complement the first imaging signal, (b) a case where a part of the first imaging signal is used to complement the second imaging signal, and (c) a case where a part of the first imaging signal and a part of the second imaging signal are used. Details of how to use the first imaging signal and the second imaging signal will be described later.

Signal processor 23 is a part that executes a signal process before and after the arithmetic operation of object arithmetic operation unit 22. Details of signal processor 23 will be described later.

Arithmetic operation unit 21 may be provided as large scale integration (LSI) where some or all of a plurality of processors are integrated circuits. The processors may be individually made into one chip, or some of or all of them may be made into one chip.

Further, the integrated circuit is not limited to LSI, and may be provided by a dedicated circuit or a general-purpose processor. A field programmable gate array (FPGA) that can be programmed after manufacturing of LSI, or a reconfigurable processor in which connection and setting of circuit cells in LSI can be reconfigured may be used.

Further, each component of arithmetic operation unit 21 (object arithmetic operation unit 22, signal processor 23) may be formed by dedicated hardware, or may be provided by executing a software program suitable for each component. Each component may be realized in such a manner that a program execution unit such as a central processing unit (CPU) or a processor reads and executes software programs recorded in a recording medium such as a hard disc or a semiconductor memory. In other words, arithmetic operation unit 21 (object arithmetic operation unit 22, signal processor 23) can suitably have, as one example, (a) a configuration where a digital signal processor (DSP) is combined with a general-purpose processor, (b) a configuration where FPGA having a plurality of DSPs is combined with a general-purpose processor, and (c) a configuration where a dedicated accelerator is combined with a general-purpose processor.

When driving support system 30 is applied to an automobile, examples of set controller 40 of driving support system 30 include (a) a main control unit (MCU), (b) an electronic control unit (ECU) mounted with MCU, and (c) an infotainment system having playback function for multimedia such as music and moving image, and an access and search function for news and e-mails as well as a navigation, a position information service, voice communication and internet connection.

Set controller 40 receives an object signal, and makes a set control based on the object signal. This control will be described in detail later. The basic configuration of the exemplary embodiments have been described above. The exemplary embodiments will be further described in detail below. The exemplary embodiments described below refer to mainly a case where passive light is used as the first light and active light (reflected active light) is used as the second light, but the first light and the second light are not limited thereto.

First Exemplary Embodiment

Configurations and operations of sensing system 10 and driving support system (operation support system) 30 according to a first exemplary embodiment that are different from the basic configuration described above will be mainly described in detail below with reference to the drawings.

Figure 3:
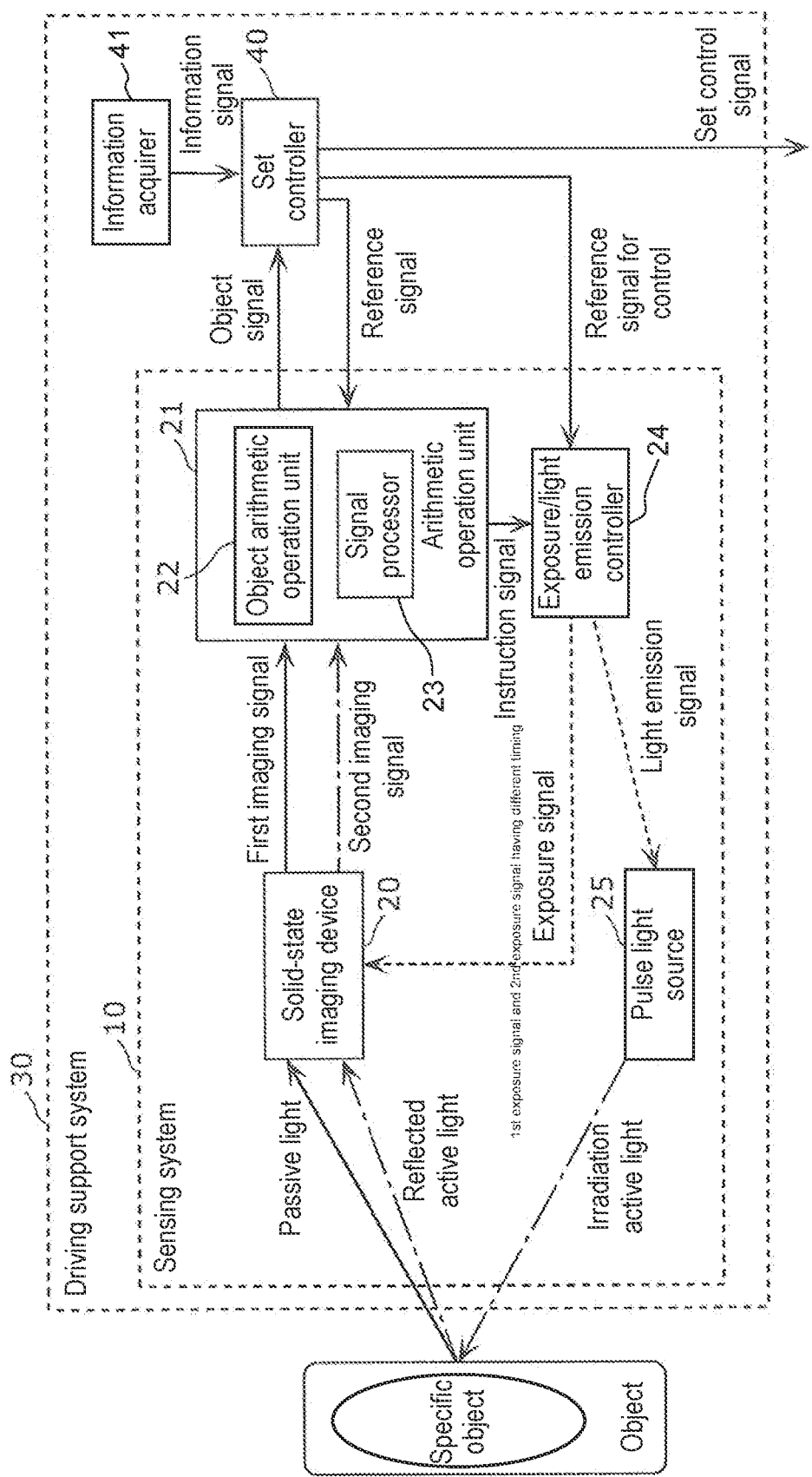
FIG. 3 is a functional block diagram illustrating a schematic configurational example of the sensing system and the driving support system according to a first exemplary embodiment.
Figure 4A:
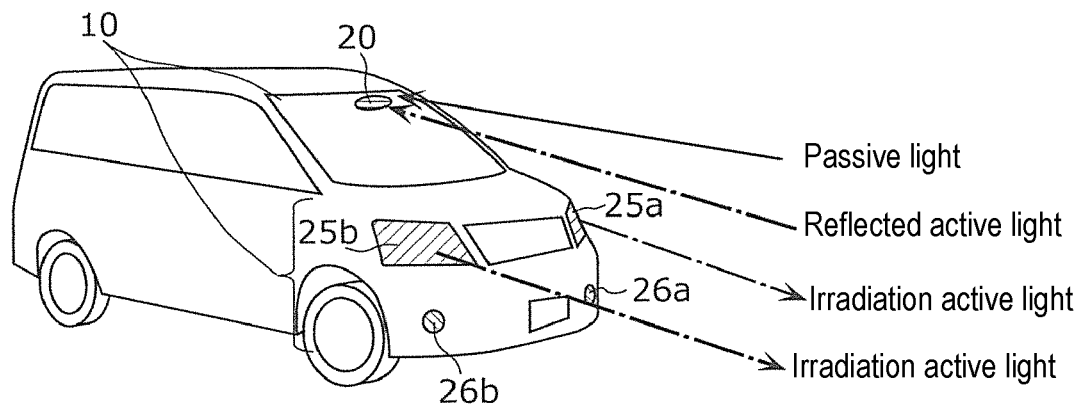
FIG. 4A is a schematic mounting diagram illustrating a first mounting example of the sensing system and the driving support system according to the first exemplary embodiment.
Figure 4B:
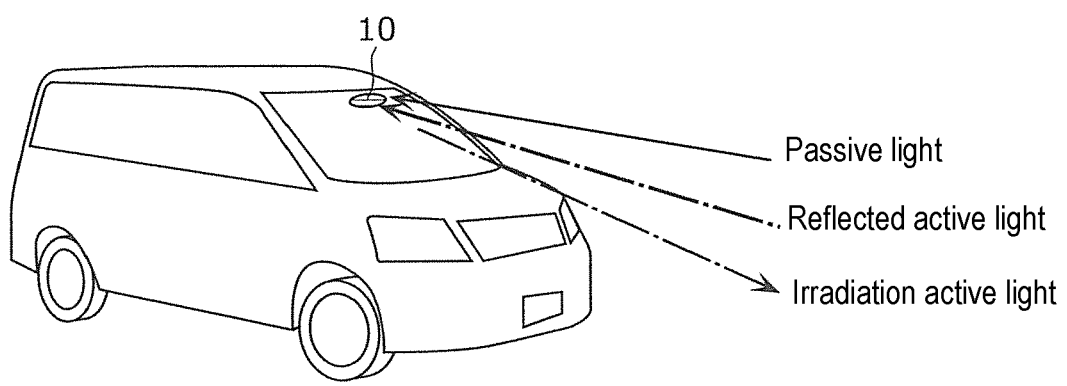
FIG. 4B is a schematic mounting diagram illustrating a second mounting example of the sensing system and the driving support system according to the first exemplary embodiment.

FIG. 3 is a functional block diagram illustrating a summary of sensing system 10 and driving support system (operation support system) 30 according to the first exemplary embodiment. FIG. 4A is a schematic mounting diagram illustrating a first mounting example of the sensing system and the driving support system according to the first exemplary embodiment. FIG. 4B is a schematic mounting diagram illustrating a second mounting example of the sensing system and the driving support system according to the first exemplary embodiment.

As shown in FIG. 3, sensing system 10 according to the first exemplary embodiment includes pulse light source 25 and exposure/light emission controller 24, in addition to solid-state imaging device 20 and arithmetic operation unit 21.

Sensing system 10 can be installed on, for example, as shown in FIG. 4A, an upper part on an inner side of a windshield (near rearview mirror), but the installation position is not limited thereto. Sensing system 10 can be also installed in, for example, a front grille, a front bumper, or the like. Although details will be described later, sensing system 10 according to the first exemplary embodiment is superior in size reduction to the sensing system such as a stereo camera. Sensing system 10 thus can be installed in various places without any limitation of installation places.

Pulse light source 25 emits light to an object according to a timing at which a light emission signal generated by exposure/light emission controller 24 is received. Further, pulse light source 25 includes a driving circuit, a capacitor, and light-emitting elements, and supplies electric charges retained in the capacitor to the light-emitting elements so as to emit pulse light (hereinafter referred to as irradiation active light).

For example, irradiation active light is infrared light (IR light) including near-infrared light. Further, various light-emitting elements such as laser diodes and light-emitting diodes (LEDs) can be used as the light-emitting elements. The light-emitting elements do not have to be monochroic light-emitting elements. The light-emitting elements may selectively emit light (for example, infrared light) from the light-emitting elements that oscillate visible light. That is, the light-emitting elements of plural kinds of colors, such as red light-emitting elements, blue light-emitting elements, and yellow light-emitting elements are combined, so that selective light (for example, infrared light) can be emitted from the wavelength region of light to be oscillated.

The irradiation active light can be emitted as light that disperses in various directions (so-called general light), and in addition, can be also emitted as laser light or radar light that has excellent directivity or convergence and can keep a wavelength of an electromagnetic wave to be generated constant.

Further, for example, as shown in FIG. 4B, when the set to be mounted with driving support system 30 is an automobile, pulse light source 25 can serve also as existence lights such as headlights 25a, 25b, or fog lights 26a, 26b mounted to a vehicle.

Exposure/light emission controller 24 generates a light emission signal for instructing pulse light source 25 to emit irradiation active light. Further, exposure/light emission controller 24 generates an exposure signal for indicating exposure of reflected light (reflected active light) of irradiation active light as the second light (the second physical target). Exposure/light emission controller 24 also generates an exposure signal for instructing exposure of normal object light generated by outside light such as solar light and indoor light that is the first light (the first physical target), in other words, irradiation light (passive light) that is the first light and is not caused by irradiation active light but generated from the object (or the specific object). In such a manner, exposure/light emission controller 24 has a function of a signal generator for generating the light emission signal for instructing light emission and the exposure signal for instructing exposure.

Sensing system 10 has solid-state imaging device 20. Sensing system 10 performs exposure and imaging according to the exposure signal, receives passive light from the object so as to output the first imaging signal, and receives reflected active light obtained when irradiation active light from pulse light source 25 is reflected from the object so as to output the second imaging signal.

Further, arithmetic operation unit 21 receives a reference signal from the set side (in FIG. 3, set controller 40). This reference signal is a signal that is generated on the set side based on an information signal from information input unit (various sensors or the like) 41 mounted to the set side and that represents a situation of sensing environment (a change in the sensing environment).

Further, the reference signal or the information signal is a signal representing, as one example of contents (information), (a) position information of a set (an automobile) from a global positioning system (GPS) sensor or the like, (b) cloud information (in other words, information obtained from a network, particularly, an internet (network information), namely, so-called big data (that includes data (information) generated by popularization of internet and IT technological evolution, in which the characteristics are represented by an amount, frequency (an updating speed), and diverseness (data type)), and (c) motion/operation information of the set (the automobile).

Further, examples of (b) the cloud information obtained from a communication line (an internet line) include (b1) the latest map information (this map information includes information on a plane (in a horizontal direction) and information about an object on the map (for example, architectural structures such as buildings and tunnels) in a height direction (a vertical direction)), (b2) information about a travelling place that sequentially changes (or a scheduled travelling place) (time-series information or real-time information), such as construction information and traffic jam information on a travelling route, (b3) high-definition (map) information including a difference between general roads and freeways and road widths, and (b4) set (automobile) position information on a map in combination with information from the GPS sensor.

Further, examples of (c) the motion/operation information of the set (the automobile) include signals representing (c1) information about a travelling speed, a travelling acceleration and stop of the set (the automobile), (c2) stepping information of an accelerator pedal and a brake pedal (driving operation information), (c3) a position of a transmission gear (selection between a gear for forward travelling and a gear for backward travelling), and (c4) information about a cargo loading weight of a trunk (namely, information about a load balance of the automobile).

The information signal (and the reference signal based on the information of the information signal) is not limited to the above examples. Further, in this exemplary embodiment, a control reference signal based on the information signal may be received by exposure/light emission controller 24.

Further, object arithmetic operation unit 22 in arithmetic operation unit 21 is a unit that performs an arithmetic operation for sensing the object (or the specific object), and calculates an object signal of the specific object (or the object) based on the first imaging signal and the second imaging signal from solid-state imaging device 20. The object signal represents, for example, (a) detection of the object (hereinafter referred to as a detection process), (b) recognition of the object (or the specific object) (hereinafter referred to as a recognition process), and (c) the distance up to the object (or the specific object), the dimension (height, width) of the object (or the specific object), the shape of the object (or the specific object), and the speed of the object (or the specific object).

Further, sensing system 10 according to the exemplary embodiment can calculate an object signal according to an arithmetic operation solely using the second imaging signal (the reflected active light). One example of the arithmetic operation method is a time of flight (TOF) method. According to the TOF method, in response to the light emission signal, active light pixels in solid-state imaging device 20 are exposed with a reflected active light from a target to be measured in two different timing patterns of a first exposure signal and a second exposure signal as the exposure signal. The distance up to the target to be measured (the object) can be calculated based on the ratio of exposure light quantities. In other words, exposure is performed on the object at plural times according to a timing indicated by the exposure signal generated at exposure/light emission controller 24, and an imaging signal corresponding to total amounts of exposure at plural times can be output.

For example, exposure is performed by the first exposure signal so that entire reflected light from the target to be measured is included, and exposure is performed by the second exposure signal so that the exposure amount increases as the reflected light from the target to be measured is delayed from the light-emission timing. Further, in order to detect an offset component such as background light, the light emission signal is stopped and the exposure is performed on the first exposure signal and the second exposure signal under the same condition.

A sum total S1 of the exposure amount of the first exposure signal, a sum total S0 of the exposure amount of the second exposure signal, a sum total BG of the exposure amount of background light, a duration T0 which is a timing difference between the first exposure signal and the second exposure signal, and a distance L from each value of a light speed c to the object are calculated by using the following Formula 1.

$$L = \frac{c \cdot T_0}{2} \times \left( \frac{S1 - BG}{S0 - BG} \right) \qquad \text{[Formula 1]}$$

Further, the light emission signal and the first exposure signal are repeatedly output at plural number of times at timings of the light emission signal, the first exposure signal, and the second exposure signal on one screen. Thereafter, the light emission signal and the second exposure signal are output repeatedly at the same number of times. The light emission signal is then stopped, and exposure signals whose condition is the same as the first exposure signal and second exposure signal are output repeatedly at the same number of times. This one sequence of the timing is provided as one set. After the output is repeated by a plurality of sets, an accumulated exposure amount is output so that the distance to the object may be calculated by Formula 1.

Sensing system 10 according to the exemplary embodiment can use an arithmetic operation process other than the TOF method. As one example, sensing system 10 can use a pattern irradiation method for emitting irradiation active light to the object and executing the arithmetic operation process by strain of the reflected active light.

Further, sensing system 10 according to the exemplary embodiment can calculate an object signal according to the arithmetic operation solely using the first imaging signal (the passive light). As one example of this arithmetic operation method, sequential images are captured by using the first imaging signal, a signal (an image pickup signal) of the sequential images is output to arithmetic operation unit 21, and arithmetic operation unit 21 compares a current frame (image) with a previous frame (image) so as to calculate an object signal.

In such a manner, the object signal can be arithmetically operated (calculated) by using the reference signal, the first imaging signal and/or the second imaging signal according to the most suitable arithmetic operation method in an operation environment condition (a driving situation or a stop-to-start transition situation in an automobile).

Further, signal processor 23 in arithmetic operation unit 21 is a unit that executes signal processes in order to enhance object (specific object) sensing accuracy and performance and to reduce a signal amount. Signal processor 23 executes a signal process described below, as one example, using a processing signal or a primary object signal, which will be described later, as well as the first imaging signal, the second imaging signal, and the reference signal.

Examples of the signal process include (a) a detection process, (b) a recognition process, (c) a noise subtracting process for reducing a signal to be a noise, (d) a process for clearing and enhancing definition of imaging information (pickup image) using a value that is estimated based on a singular captured image or other plural captured images with low resolution (video magnifying and definition heightening process, super-resolution process), (e) a so-called high-dynamic range (HDR) process for picking-up a plurality of images while exposure is being changed, synthesizing the images so as to calculate an image having a wide dynamic range with less halation or black defects (a high-dynamic range image) and/or reducing the dynamic range through tone mapping of the generated imaging information (the image) (a method for reducing contrast of the entire image, or a method for reducing local contrast of the image) so as to calculate an image having a standard dynamic range, (f) a process for reducing an extra portion from the imaging information so as to reduce an entire signal amount, namely, a so-called compression process, (g) a process for selecting the first imaging signal or the second imaging signal (including partial section), (h) a process for determining whether an object signal is output to a rear stage (set controller 40, described later), and (i) a selection determining process for determining whether some or all of plural pieces of information (the type of the specific object, the distance to the specific object, the dimension of the specific object, the shape of the specific object, the speed of the specific object, or the like) when the object signal is output to the rear stage (set controller 40, described later).

The signal process is not limited to the above-described processes.

Further, in the exemplary embodiment, the detection process and the recognition process can be executed by any of object arithmetic operation unit 22 and signal processor 23 as described above.

Further, lossless compression or lossy compression (as one example, MPEG, JPEG) can be used as the above compression process (0. In particular, when emphasis is placed on a transfer speed of a non-object signal from arithmetic operation unit 21 to set controller 40, lossless compression is more preferable. On the other hand, when emphasis is placed on a reduction in a signal processing load on set controller 40, described later, lossy compression is more preferable.

FIG. 5A to FIG. 5D are functional block diagrams illustrating configurational examples of the arithmetic operation unit mounted to the sensing system and the driving support system according to the first exemplary embodiment.

Arithmetic operation unit 21 is mounted with signal processors 23a, 23b as signal processor 23.

When emphasis is placed on the signal processes described above in (f), (g), (h) and (i), as shown in FIG. 5A, it is more preferable that arithmetic operation unit 21 is mounted with signal processor 23b at a rear stage of object arithmetic operation unit 22. On the other hand, when emphasis is placed on the signal processes described above in (c), (d), (e) and (f), as shown in FIG. 5B, it is more preferable that arithmetic operation unit 21 is mounted with signal processor 23a at a front stage of object arithmetic operation unit 22.

Figure 5A:
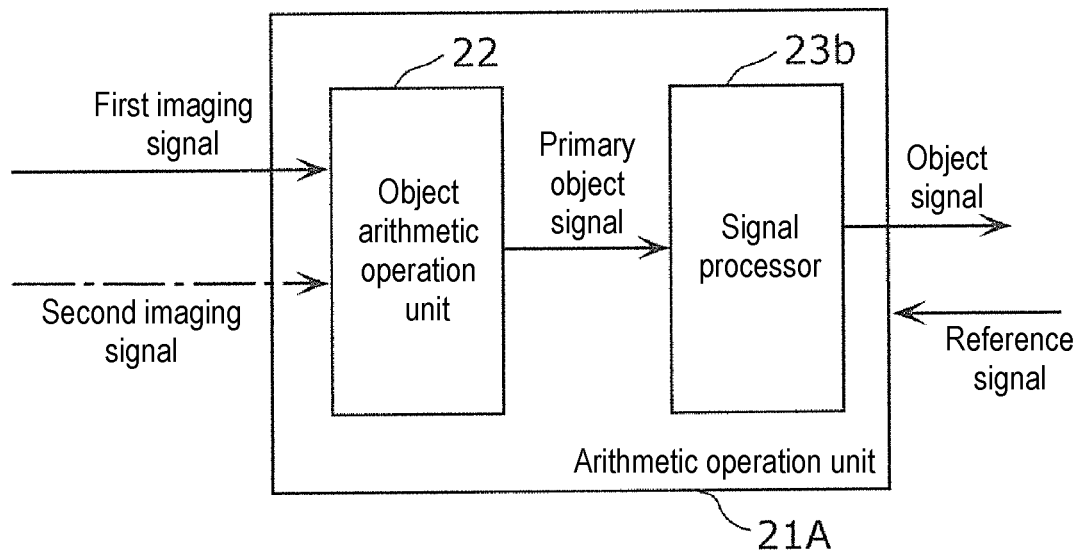
FIG. 5A is a functional block diagram illustrating one configurational example of an arithmetic operation unit to be mounted to the sensing system and the driving support system according to the first exemplary embodiment.
Figure 5B:
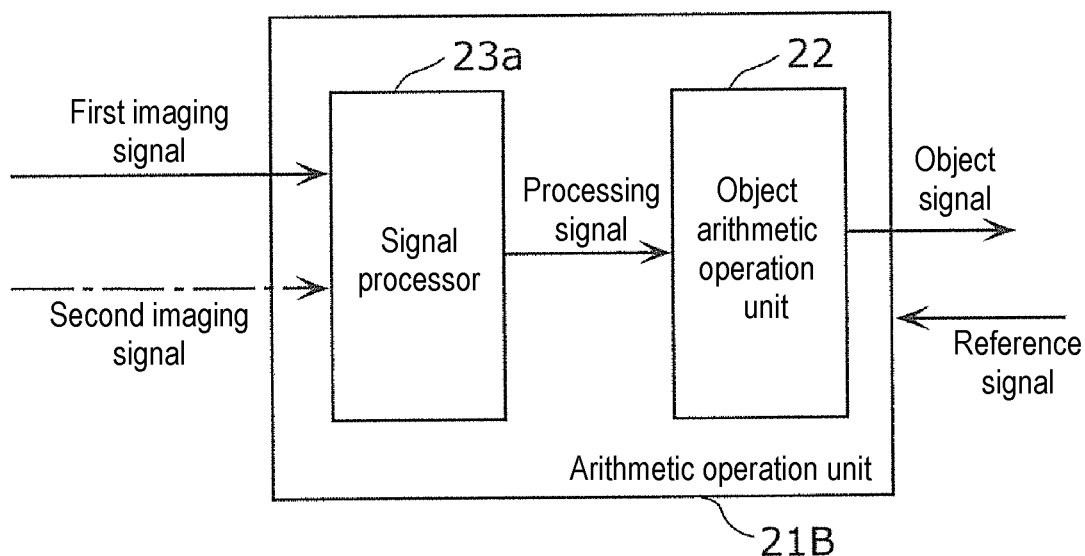
FIG. 5B is a functional block diagram illustrating another configurational example of the arithmetic operation unit to be mounted to the sensing system and the driving support system according to the first exemplary embodiment.

Further, when emphasis is placed on a load reduction of object arithmetic operation unit 22 in the signal process (0, as shown in FIG. 5B, it is more preferable that arithmetic operation unit 21 is provided with signal processor 23a at the front stage of object arithmetic operation unit 22. On the other hand, when emphasis is placed on the load reduction of the set (set controller 40) at the rear stage, as shown in FIG. 5A, arithmetic operation unit 21 may be mounted with signal processor 23b at the rear stage of object arithmetic operation unit 22.

Figure 5C:
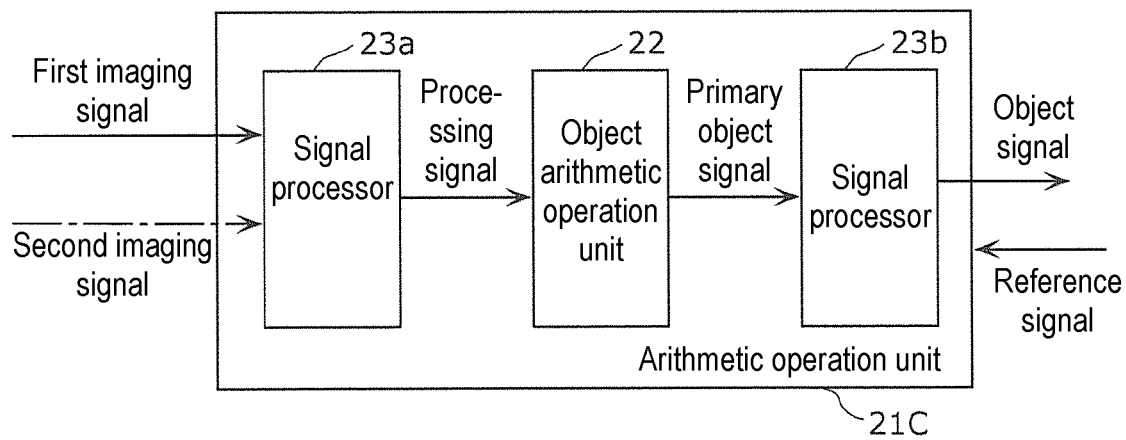
FIG. 5C is a functional block diagram illustrating still another configurational example of the arithmetic operation unit to be mounted to the sensing system and the driving support system according to the first exemplary embodiment.

Object arithmetic operation unit 22, the signal treatment units and the disposition are not limited to those shown in FIG. 5A or FIG. 5B. For example, as shown in FIG. 5C, signal processors 23a, 23b may be disposed at the front stage and the rear stage of the object processor. In this case, the arithmetic operation can be optimized more definitely and accurately.

Figure 5D:
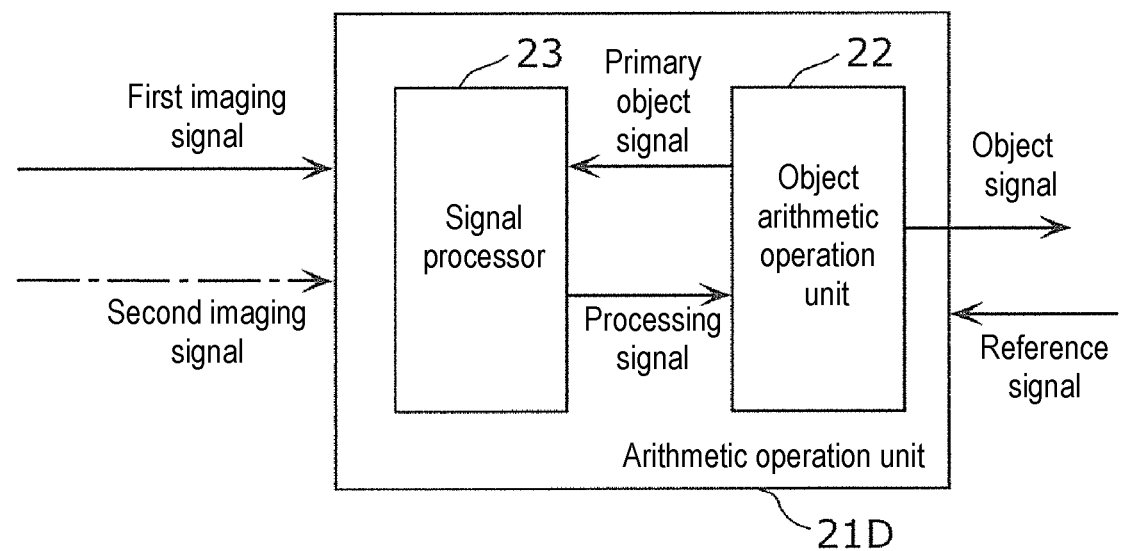
FIG. 5D is a functional block diagram illustrating still another configurational example of the arithmetic operation unit to be mounted to the sensing system and the driving support system according to the first exemplary embodiment.

Further, as shown in FIG. 5D, object arithmetic operation unit 22 forms a primary object signal using a processed signal processed by signal processor 23, and signal processor 23 again executes the signal process (occasionally the process is repeated), so as to output an object signal. In this case, heightening of the arithmetic operation accuracy and reduction in size of arithmetic operation unit 21 becomes possible at a high level.

Further, arithmetic operation unit 21 performs the arithmetic operation according to optimum selection (or complementation) of the first imaging signal and the second imaging signal in an operation environmental condition (a driving situation or a stop-to-start transition situation in an automobile).

One example of proper use of this arithmetic operation method (how to use) will be described below.

(a) A first method is a method for selecting the first imaging signal or the second imaging signal depending on daytime and night-time. For example, in the daytime, the first imaging signal is mainly used in the exemplary embodiment. On the other hand, when a clear visible image cannot be captured in the night-time, the second imaging signal is mainly used. As a result, sensing can be accurately performed at any hour of day or night.

(b) A second method is a method for selecting the image pickup signal or the imaging signal depending on weather or environmental conditions. For example, the second imaging signal is mainly used in a case of strong sunlight in the late afternoon or raining, and the first imaging signal is mainly used in the other environments. As a result, the sensing can be performed with high accuracy even in any weather and situation.

(c) A third method is a method for selecting the first imaging signal or the second imaging signal depending on the distance to the object. Specifically, the second imaging signal is mainly used at a close distance where a wide angle image tends to be obtained, and the first imaging signal is mainly used at intermediate and far distances. As a result, the sensing can be performed with high accuracy even at any distance to the object.

(d) A fourth method is a method for selecting the first imaging signal or the second imaging signal depending on a moving speed of a transportation device (for example, an automobile) mounted with this system or a moving speed of an object. For example, when the speed of the transportation device is a high speed of 100 km/h or more, it is more preferable that the second imaging signal is mainly used.

(e) In a fifth method, when the transportation device (for example, the automobile) mounted with this system in a stopped state starts to run (starts forward or starts backward), the priority is given to measurement accuracy of the distance to the object (or the specific object), and the first imaging signal is mainly used.

In the exemplary embodiment, the first imaging signal or the second imaging signal is selected depending on the state of the measurement environment (the sensing environment), but the present disclosure is not limited to this. For example, in order to make the arithmetically operated result using one signal accurate, the other signal can be used depending on the environmental state.

For example, as details of the fourth method (d), when the speed of the transportation device is a low speed up to, for example, 30 km/h, any of the arithmetically operated result of the second imaging signal and the arithmetically operated result of the first imaging signal is used as complementation information, so that a final distance may be calculated. Further, the second imaging signal and the first imaging signal are used properly in each frame at a middle speed between 30 km/h to 100 km/h, for example, and the second imaging signal may be used at a high speed of 100 km/h or more, for example. As a result, the distance can be measured with high accuracy even at any distance to the object.

(f) In a sixth method, when an edge line portion of the object (or the specific object) is obtained using the image pickup signal (the first imaging signal) and the detection process (a so-called edge detection process) is executed, the compression process is also executed. As a result, an outline of the image (an edge of the object) is blurred and thus information about the edge line portion cannot be sufficiently obtained. At this time, a TOF signal (the second imaging signal) is used as a complementation signal (i.e., an operation using TOF is used as a complementation operation for an arithmetic operation using a compressed image). Consequently, the signal amount can be reduced (signal compression, data compression) without deteriorating the accuracy of object detection and object recognition.

Further, arithmetic operation unit 21 outputs the object signal to set controller 40, and set controller 40 makes the set control. Results that are obtained, for example, when the imaging signal cannot be sufficiently obtained and thus the arithmetic operation cannot be performed are included as the object signal as described later.

Further, when the set to be mounted with driving support system 30 is an automobile, examples of the set control (the set operation) using the object signal output from sensing system 10 include (a) an automatic brake operation that avoids a crash when an obstacle is present in front of a travelling automobile, (b) a start-stop operation that stops start of a vehicle when an accelerator pedal is stepped by mistake instead of a brake pedal regardless of the presence of an obstacle under suspension, (c) an emergency brake signal operation that visually indicates sudden braking for a car behind, (d) an automatic steering operation when a determination is made that only an automatic brake does not have an enough effect on a crash avoidance, and (e) a so-called automatic driving operation that enables a driver to travel using an object signal about a lane of a road or the like without steering operation. The set operation is not limited to the above examples.

Figure 6:
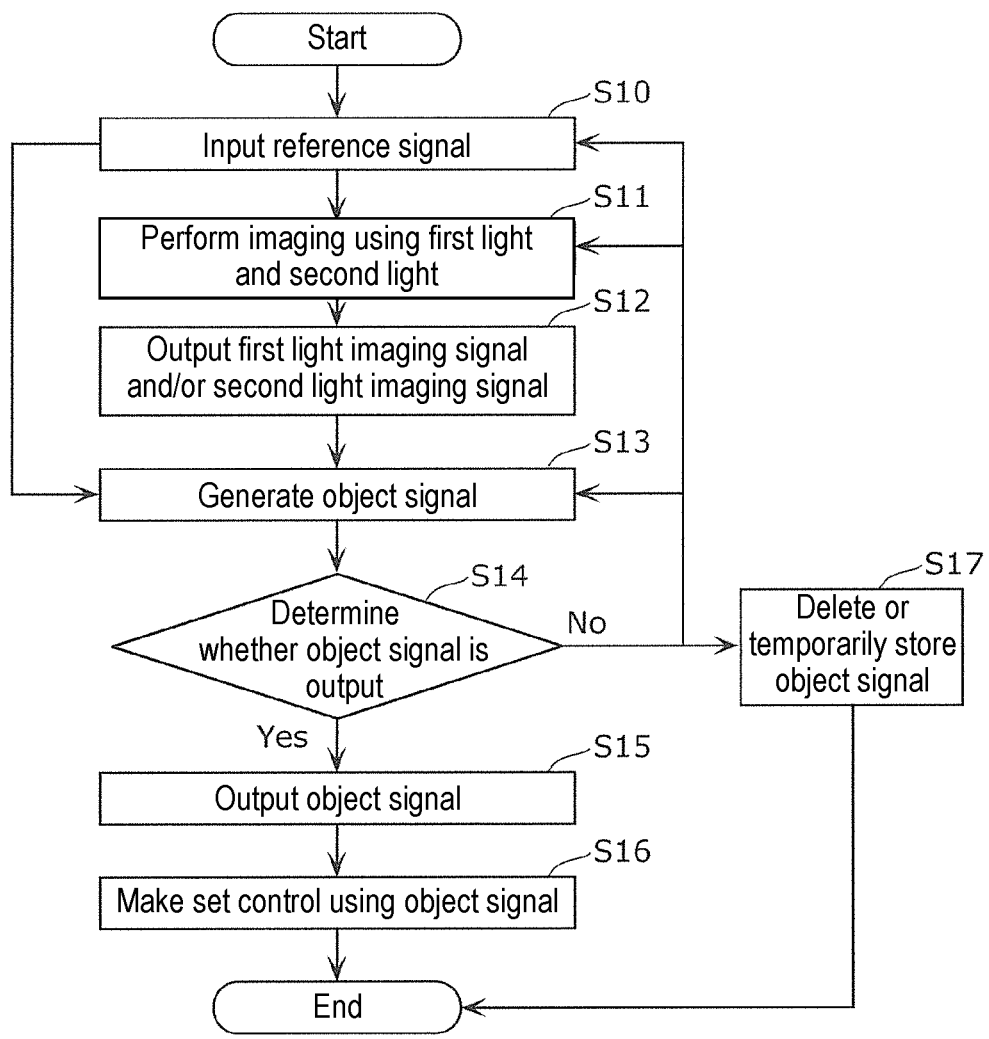
FIG. 6 is a flowchart of the sensing system and the driving support system according to the first exemplary embodiment.

A process flow of sensing system 10 according to the first exemplary embodiment will be described below with reference to FIG. 6. FIG. 6 is a flowchart of the sensing system and the driving support system according to the first exemplary embodiment.

Firstly, sensing system 10 receives the reference signal from the set side (S10).

Solid-state imaging device 20 calculates the first imaging signal and the second imaging signal based on the first light and the second light (S11).

Then, the first imaging signal and/or the second imaging signal are/is output to arithmetic operation unit 21 (S12).

Arithmetic operation unit 21, then, executes the object arithmetic operation process and the signal process based on the first imaging signal and the second imaging signal so as to calculate an object signal (S13). Note that, arithmetic operation unit 21 may directly receive the reference signal, and calculates the object signal using also the reference signal.

Next, a determination is made whether or not the calculated object signal is output to a rear stage (S14).

When the determination whether or not the calculated object signal is output to the rear stage is Yes at S14 (i.e., the determination is made that the calculated object signal is output to the rear stage) (Yes at S14), the object signal is output to the set side (S15).

The above-described set control is, then, made by using the object signal on the set side (S16). For example, when the distance to the object, the dimension and the shape of the object can be obtained through the arithmetic operation and the object can be detected, an automatic brake operation, an emergency brake signal operation, an automatic handling operation, an automatic acceleration operation and the like are performed by using the object signal.

The object signal includes not only information representing that the distance to the object, the dimension and the shape of the object can be obtained and the object can be detected/recognized but also information (a signal) representing that the distance to the object, the dimension and the shape of the object cannot be obtained and the object cannot be detected/recognized. For example, while the automobile is travelling in a bad weather such as heavy rain or fog and on a very crowded place, a signal (an object signal) representing that the distance to the object or the like cannot be calculated is output. The set (the automobile) side makes the set control so that a warning tone or display indicating that visibility is poor or sensing system 10 cannot calculate an object signal is provided to a driver.

When the determination whether or not the object signal is output to the rear stage is Yes, the process is ended.

When the determination whether or not the calculated object signal is output to the rear stage is No (namely, even when the signal is output, the signal is not useful as information for controlling the automobile and thus the determination is made that the object signal is not output) (No at S14), and in a first case, the signal is deleted in sensing system 10 (or although the information is temporarily accumulated (recorded or stored), the recording/storage capacity is insufficient due to calculation of a new object signal and thus the old signal is deleted by overwriting, or although the information is temporarily stored, the signal is deleted after a lapse of a certain specified time).

The case where the determination whether or not the object signal is output to the rear stage is No and the first case are ended.

Further, when the determination whether or not the calculated object signal is output to the rear stage is No (No at S14) and in a second case, for example, (a) after a new reference signal is input (obtained), the imaging is again performed so that new first imaging signal and second imaging signal are obtained, and the object arithmetic operation process and/or the signal process are again executed, (b) new first imaging signal and second imaging signal are obtained by new imaging operation, and the object arithmetic operation process and the signal process are again executed, (c) after a new reference signal is input (obtained), the object arithmetic operation process and signal process are again executed, or (d) the object arithmetic operation process and the signal process are again executed.

Thereafter, the determination is again made whether or not the object signal is output and the determination is Yes, the object signal is output, and the set control is made based on the object signal.

The case where the determination whether or not the object signal is output to the rear stage is No and the second case are ended.

Sensing system 10 according to the exemplary embodiment described above with reference the drawings has the following advantages.

According to the exemplary embodiment, while upsizing and high cost of sensing system 10 are avoided, sensing and sensing calculation (calculation of an object signal) can be performed more accurately than general sensing systems (i.e., stand-alone systems).

Further, in the exemplary embodiment, the object signal is calculated by suitably using plural types of imaging signals (the first imaging signal obtained by reflected active light, the second imaging signal obtained by passive light) and the reference signal. Accordingly, the object signal can be always calculated with high accuracy even in a constantly changing environment during travelling of an automobile, for example.

In particular, as shown in FIG. 2A to FIG. 2E, in sensing system 10 according to the exemplary embodiment, one solid-state imaging device 20 that outputs the first imaging signal and the second imaging signal is used. In other words, single-plate solid-state imaging device 20 is used. For this reason, the imaging centers of the imaging signals (optical centers, optical axis centers) are the same, a phase difference between the imaging signals is small, and the synchronization accuracy of the imaging signals is high. Accordingly, compatibility and correlation of the calculated results based on the first imaging signal and the second imaging signal are high, and thus the object signal can be calculated more accurately.

Further, in the exemplary embodiment, sensing system 10 has arithmetic operation unit 21, and uses the reference signal from the set side, i.e., the reference signal based on information from various sensors (the GPS sensor or the like) and the cloud. Thus, optimum imaging and arithmetic operation can be always performed with high accuracy in environmental situation that constantly changes on time basis (traffic jam information, construction information), and thus the set control (driving control, operation control) can be performed with high accuracy in any cases.

For example, when the determination is made that the vehicle is travelling on a freeway based on a reference signal (position information about the set (the automobile) on a map in combination with the GPS sensor, the cloud information and the like, speed information as motion/operation information about the set itself), the system mounted vehicle that is a vehicle mounted with sensing system 10 according to the exemplary embodiment calculates an object signal for placing emphasis on a front vehicle as a front object that moves at a high speed, and transmits the object signal to set controller 40, so that set controller 40 can make the set control that is suitable for the situation.

Further, as another example, when the determination is made that the automobile is travelling on a narrow road for both pedestrians and vehicles based on the reference information (in other words, the vehicle mounted with this system travels at comparatively low speed), the vehicle mounted with this system can output an object signal for placing emphasis on detection and recognition of various objects or specific objects (for example, pedestrians, bicycles, animals, and obstacles that enter the road, in addition to a front vehicle) in a range where the distance to the object is relatively short, so that set controller 40 can make the set control suitable for the situation.

Further, in the exemplary embodiment, the signal processor executes the signal process so as to always perform optimum imaging and arithmetic operation with high accuracy. Accordingly, the high-definition set control (the driving control, the operation control) can be made under any environmental conditions.

Further, in the exemplary embodiment, the signal processor executes the signal process, and thus an object signal has capacity of a gigabit order. Accordingly, the necessity of high-speed data transmission can be avoided.

Further, in the exemplary embodiment, sensing system 10 selectively outputs an object signal so as to perform successive imaging and successive arithmetic operation without placing a great load on arithmetic operation unit 21.

Further, in the exemplary embodiment, since a calculated result from arithmetic operation unit 21 (an object signal) is selectively (at a suitable timing) transmitted to the controller on the set side, an arithmetic operation load on the set side (set controller 40) can be reduced. Accordingly, high accuracy of the arithmetic operation, the high-speed arithmetic operation, the high-speed process, low power consumption can be realized.

Particularly in automobile application, in recent years, set controller 40 (an integrated circuit) is highly integrated (as one example, the number of general-purpose processors (CPUs) is increased) in order to make a lot of controls. As a result, the power consumption and the cost are increased in the entire set, namely, the load becomes extremely large. However, this problem can be solved in the exemplary embodiment.

Second Exemplary Embodiment

A configuration and an operation of a sensing system (a distance measuring and imaging system) according to a second exemplary embodiment, which are different from the basic configuration and the contents described in the above exemplary embodiment, will be mainly described below in detail with reference to the drawings.

Figure 7A:
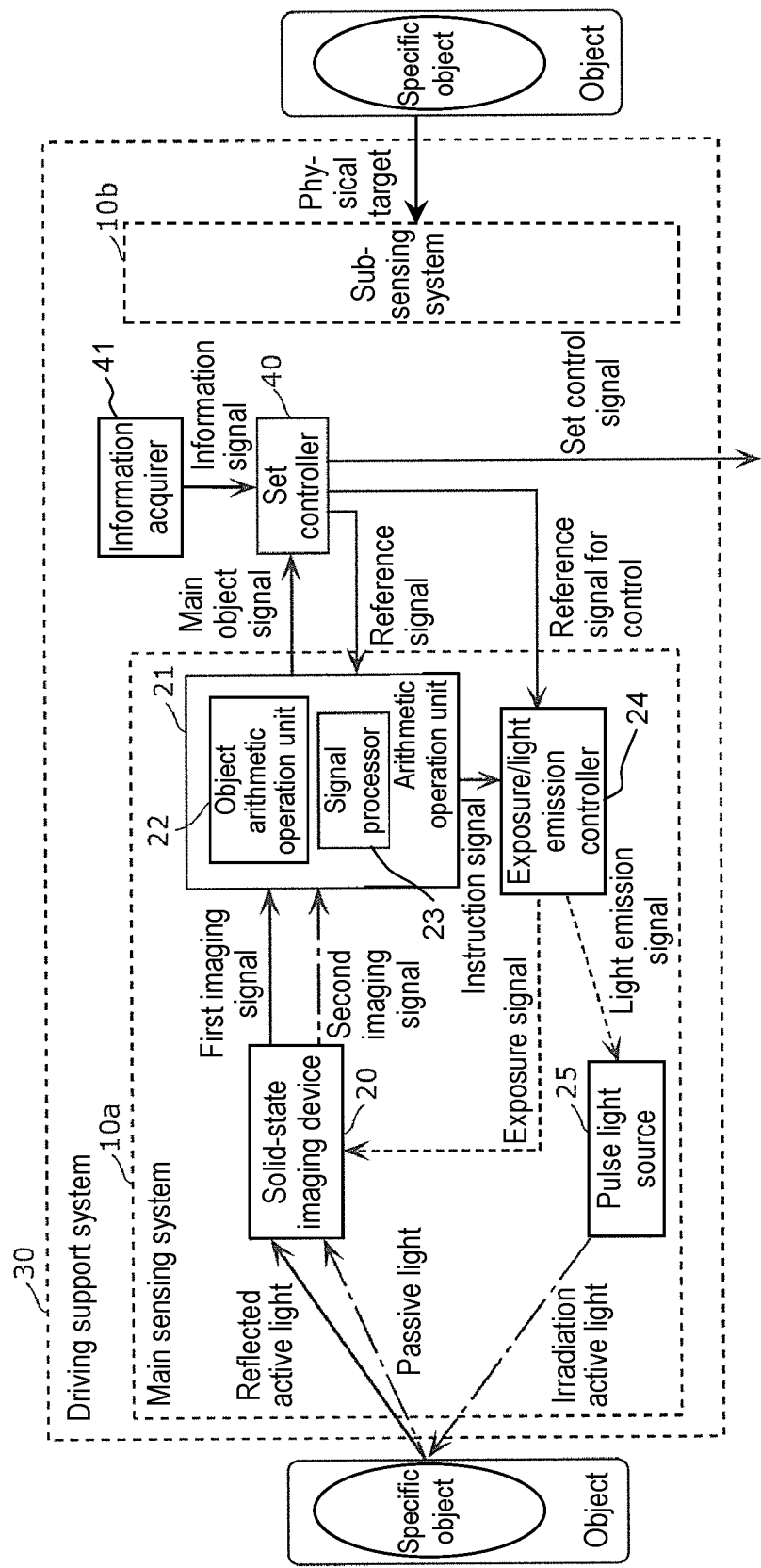
FIG. 7A is a functional block diagram illustrating a schematic configurational example of the sensing system and the driving support system according to a second exemplary embodiment.
Figure 7B:
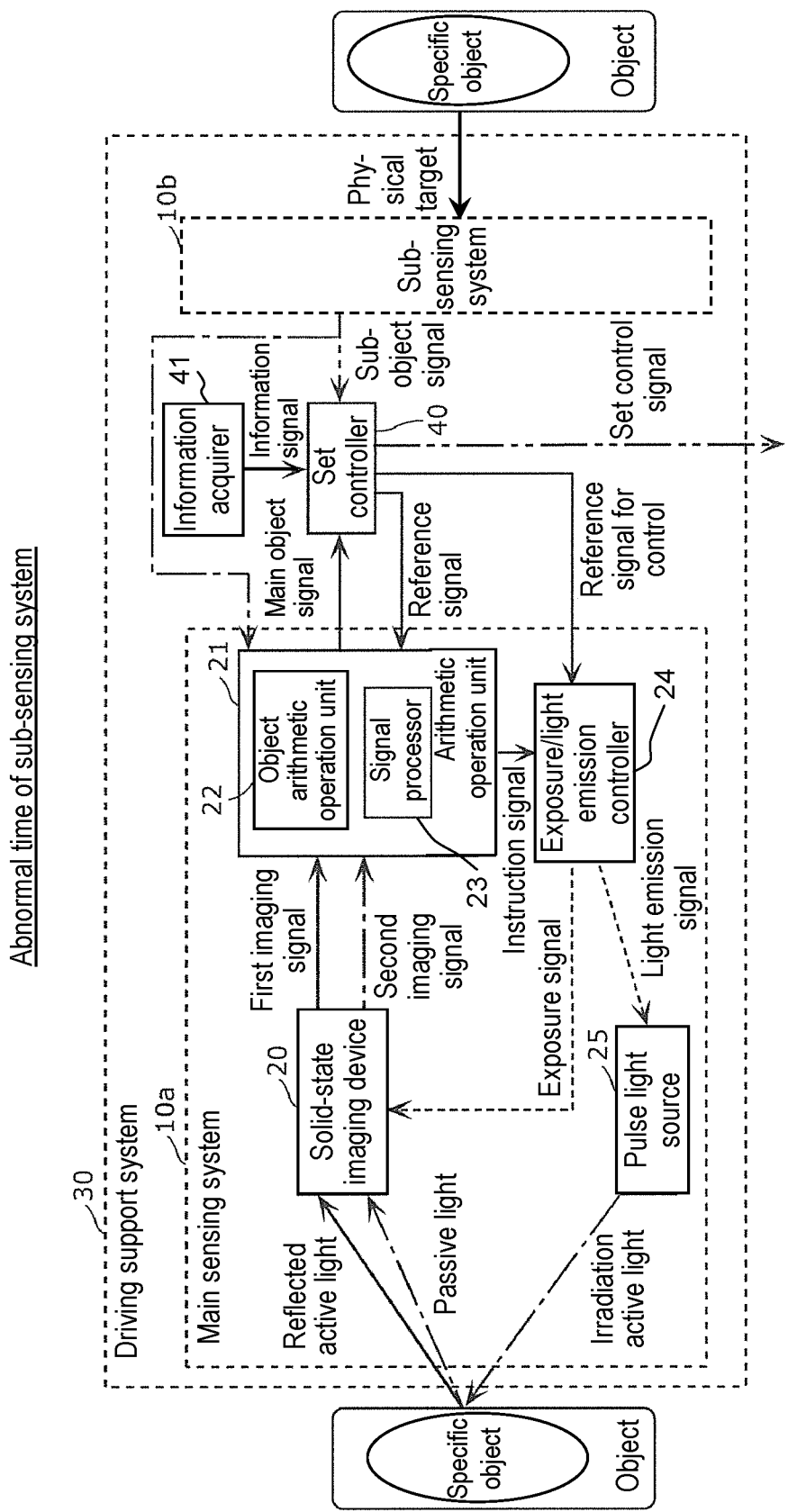
FIG. 7B is a functional block diagram illustrating a schematic configurational example of the sensing system and the driving support system according to the second exemplary embodiment.

FIG. 7A and FIG. 7B are functional block diagrams illustrating schematic configurational examples of the sensing system and a driving support system according to the second exemplary embodiment.

The points different from the basic configuration in FIG. 1 and the difference from the configuration in FIG. 3 will be mainly described below. Driving support system 30 according to the exemplary embodiment shown in FIG. 7A and FIG. 7B includes main sensing system 10a and sub-sensing system 10b.

Main sensing system 10a shown in FIG. 7A and FIG. 7B has the same basic configuration as that of sensing system 10 shown in FIG. 3. The process flow is, however, partially different from the basic configuration, and its details will be described later. Main sensing system 10a may have a system different from that shown in FIG. 3.

On the other hand, sub-sensing system 10b in FIG. 7A and FIG. 7B executes, for example, (a) a detection process for a specific object in an object, (b) a recognition process for an object (or a specific object), and (c) calculation of a distance, a dimension, a shape, and a speed of the specific object (or object). Sub-sensing system 10b can be of the same type as main sensing system 10a. However, in view of narrowing down the functions, lowering the cost, and reducing the size, sub-sensing system 10b can be of a different type from main sensing system 10a (as one example, a sensing system using a millimeter wave radar or a laser radar).

Further, FIG. 7A and FIG. 7B illustrate one sub-sensing system 10b, but a plurality of sub-sensing systems 10b can be provided.

Details will be described below with reference to FIG. 8A and FIG. 8B.

Figure 8A:
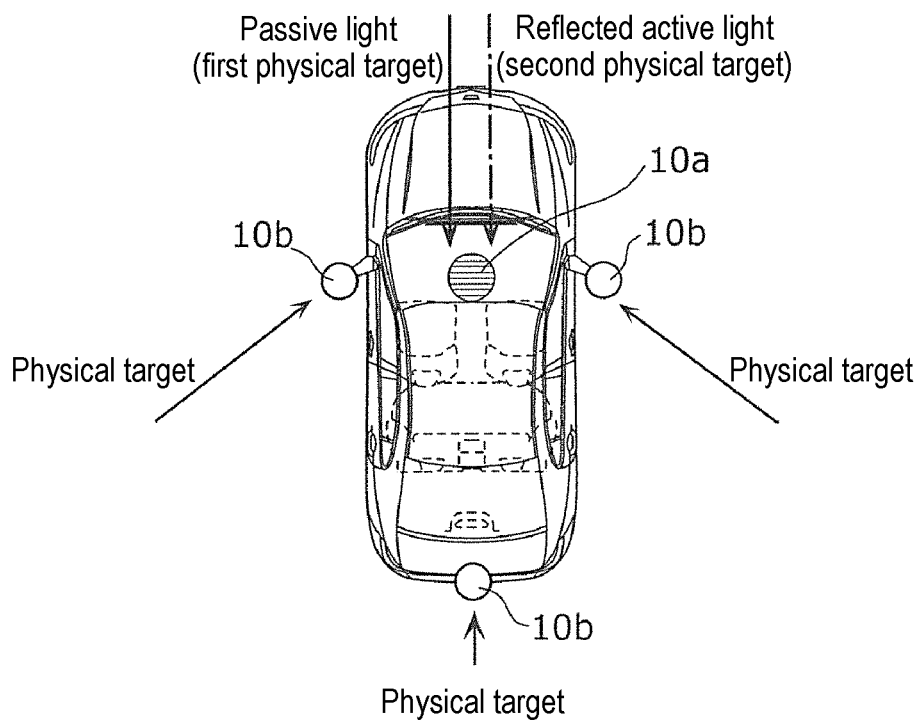
FIG. 8A is a schematic mounting diagram illustrating a first mounting example of the sensing system and the driving support system according to the second exemplary embodiment.

FIG. 8A is a schematic mounting diagram illustrating a first mounting example of the sensing system and the driving support system according to the second exemplary embodiment. FIG. 8B is a schematic mounting diagram illustrating a second mounting example of the sensing system and the driving support system according to the second exemplary embodiment.

As shown in FIG. 8A, main sensing system 10a is installed to be used in front sensing which is regarded as most important in travelling, and sub-sensing system 10b is installed to sense the side and rear of a vehicle. Therefore, the sensing can be performed in all directions of the vehicle.

Figure 8B:
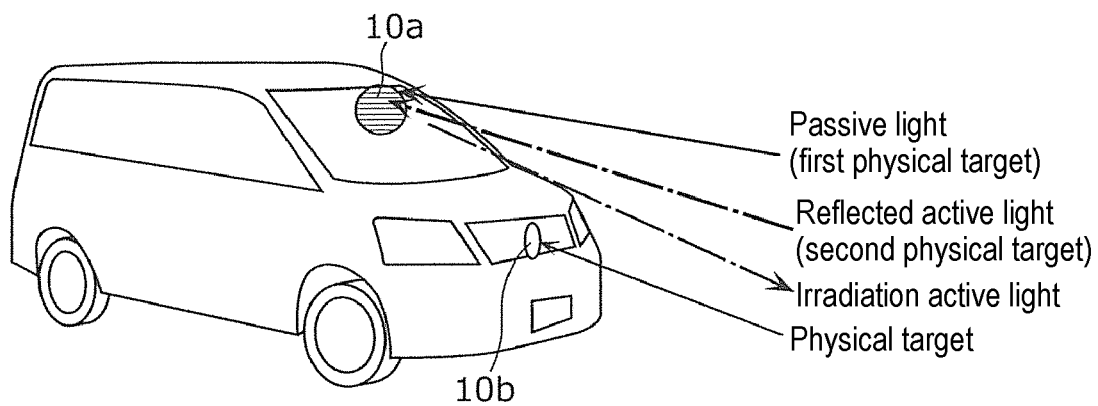
FIG. 8B is a schematic mounting diagram illustrating a second mounting example of the sensing system and the driving support system according to the second exemplary embodiment.

On the other hand, as shown in FIG. 8B, sub-sensing system 10b may be installed to perform sensing in the same direction as main sensing system 10a. Therefore, the sensing in the same direction (the forward direction) can be performed more accurately.

Disposition of main sensing system 10a and sub-sensing system 10b is not limited to the above examples, and main sensing system 10a and sub-sensing system 10b can be installed in other places. The installation shown in FIG. 8A and the installation shown in FIG. 8B can be combined.

Description will be given again with reference to FIG. 7A and FIG. 7B. FIG. 7A illustrates a case where main sensing system 10a is in normal and abnormal states, and sub-sensing system 10b is in a normal state. FIG. 7B illustrates a case where sub-sensing system 10b is in an abnormal state. Note that, the abnormal state refers to a state that a device (transportation device) might collide with an obstacle.

As shown in FIG. 7A, sub-sensing system 10b does not output the calculated result to set controller 40 during the normal state. On the other hand, as shown in FIG. 7B, when sub-sensing system 10b is in the abnormal state and object information to which an attention should be paid is obtained, a sub-object signal is output to the set side (set controller 40).

Further, when the sub-object signal is output and the set is an automobile (transportation device) (particularly, used as a system for sensing in the forward direction), the set control is made. Examples of the set control include (a) automatic start-stop control when an accelerator pedal is stepped by mistake instead of a brake pedal regardless of the presence of an obstacle under suspension, (b) an emergency brake signal motion that visually indicates sudden braking for a car behind, and (c) an automatic steering operation when the determination is made that only an automatic brake is not enough for crash avoidance. However, the set operation is not limited to the above examples.

In the above control, a collision with a front vehicle may be occurred in some cases, but the collision can be avoided in the exemplary embodiment. The details will be described below with reference to FIG. 9.

Figure 9:
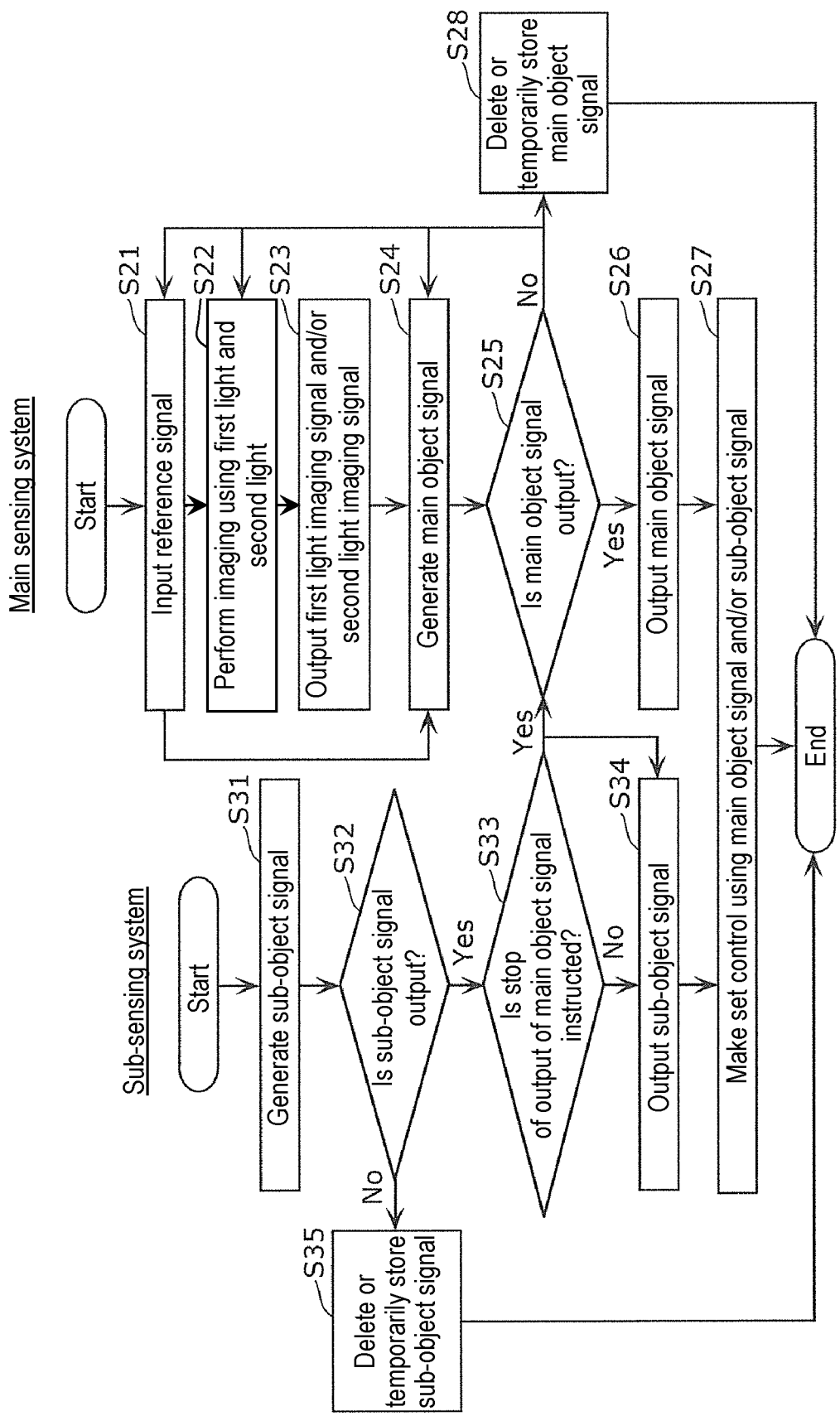
FIG. 9 is a flowchart diagram of the sensing system and the driving support system according to the second exemplary embodiment.
Figure 10:
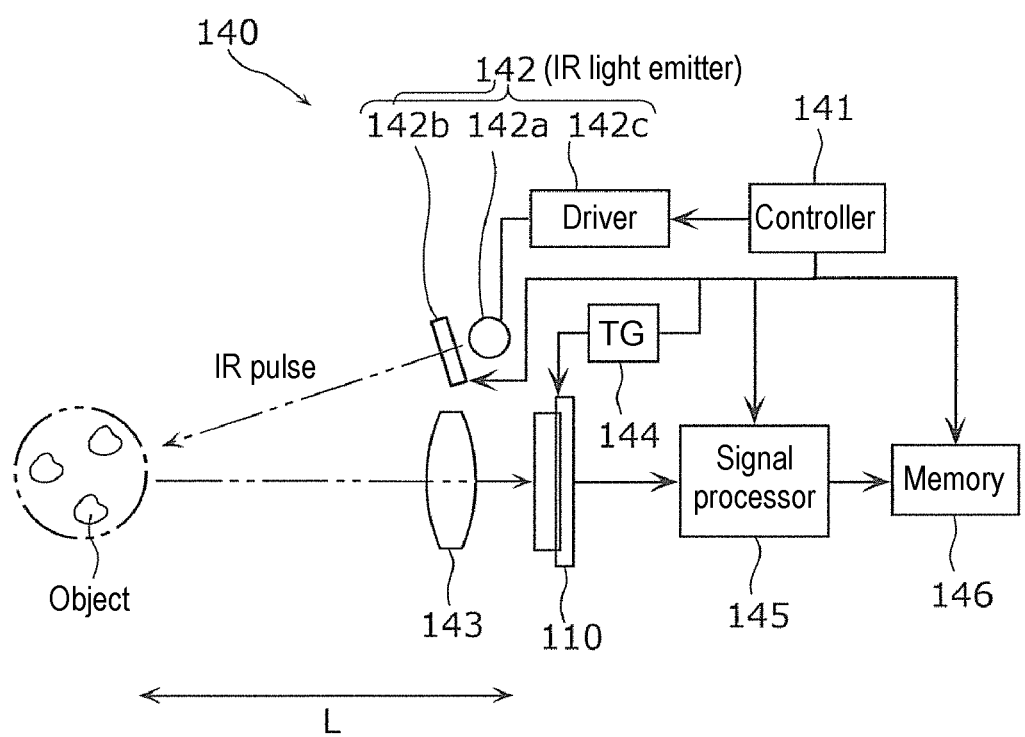
FIG. 10 is a functional block diagram illustrating a schematic configuration of an imaging system of a conventional technique.

FIG. 9 is a flowchart diagram of the sensing system and the driving support system according to the second exemplary embodiment.

A process flow of sensing system 10 according to the second exemplary embodiment will be described below with reference to FIG. 9.

Firstly, main sensing system 10a receives a reference signal from the set side (S21).

Solid-state imaging device 20, then, calculates a first imaging signal and a second imaging signal based on first light and second light, respectively (S22).

Next, solid-state imaging device 20 outputs the first imaging signal and/or the second imaging signal to arithmetic operation unit 21 (S23).

Then, arithmetic operation unit 21 executes an object arithmetic operation process and a signal process based on the first imaging signal and the second imaging signal so as to calculate a main object signal (S24). Note that, arithmetic operation unit 21 may directly receive the reference signal and calculate the main object signal also using such reference information.

Sub-sensing system 10b that is operated at the same timing of main sensing system 10a will be described below.

Firstly, sub-sensing system 10b calculates a sub-object signal (S31).

Next, sub-sensing system 10b determines whether or not the sub-object signal is output to the set side (S32). Sub-sensing system 10b outputs the sub-object signal to the set side (set controller 40) regardless of whether stop of the output of the main object signal is instructed at S33.

When the determination at S32 whether or not the sub-object signal is output to a rear stage is No (namely, even when the sub-object signal is output, this signal is not information useful for making the set control and thus the determination is made that the sub-object signal is not output) (No at S32), the sub-object signal is deleted (or although the information is temporarily accumulated, the recording/storage capacity is insufficient due to calculation of a new sub-object signal and thus the old signal is deleted by overwriting of the sub-object signal, or although the information is temporary accumulated, the signal is deleted after a lapse of a certain specified time) (S35).

The case where the determination whether or not the sub-object signal is output to the rear stage is No is ended.

On the other hand, when the determination at S32 whether or not the sub-object signal is output to the rear stage is Yes (namely, the determination is made that the sub-object signal is output) (Yes at S32), the sub-object signal is output to the set side (set controller 40) (S33), and a signal about this determination (an output determination signal) is output to main sensing system 10a (Yes at S33).

Then, main sensing system 10a determines whether or not the main object signal is output to the rear stage in consideration of the output determination signal (S25). This determination does not have to wait for input of the output determination signal.

When the determination at S25 whether or not the main object signal is output to the rear stage is No (even when the main object signal is output, this signal is determined as not being information useful for controlling an automobile, or the determination is made that the sub-object signal takes precedence over the main object signal) (No at S25) and in the first case, the main object signal is deleted in the sensing system (or although the information is temporarily accumulated, the recording/storage capacity is insufficient due to calculation of a new object signal and thus the old signal is deleted by overwriting of the main object signal, or although the information is temporary accumulated, the signal is deleted after a lapse of a certain specified time) (S28).

Further, when the determination at S25 whether the main object signal is output to the rear stage is No (No at S25) and in the second case, similarly to the first exemplary embodiment, for example, (a) after a new reference signal is input (obtained), the imaging is again performed so that new first imaging signal and second imaging signal are obtained, and the object arithmetic operation process and/or the signal process are again executed, (b) new first imaging signal and second imaging signal are obtained by new imaging operation, and the object arithmetic operation process and the signal process are again executed, (c) after a new reference signal is input (obtained), the object arithmetic operation process and signal process are again executed, or (d) the object arithmetic operation process and the signal process are again executed.

The process in the case where the determination whether the main object signal is output to the rear stage is No (No at S25) and the second case is ended.

On the other hand, when the determination at S25 whether or not the main object signal is output to the rear stage is Yes (Yes at S25), the main object signal is output to the set side (S26).

Then, the set control is made on the set side by using the sub-object signal and the main object signal as described above (S27). Accordingly, when danger in a direction to be monitored by sub-sensing system 10b (a rear side) is avoided, the danger avoidance (set control) is possible in consideration of a situation in a direction to be monitored by main sensing system 10a (a front side).

As described above with reference to the drawings, in the driving support system according to the exemplary embodiment, the set control can be made with respect to danger in a plurality of directions.

Further, in the exemplary embodiment, the set control is made by appropriately selecting the case of using only the sub-object signal and the case of using the sub-object signal and the main object signal. When the danger in the direction to be monitored by the sub-sensing system 10b (the rear side) is avoided, the danger avoidance (the set control) can be performed in consideration of the situation in the direction to be monitored by main sensing system 10a (the front side).

Further, in the exemplary embodiment, the case of using only the sub-object signal and the case of using the sub-object signal and the main object signal are appropriately selected. In other words, the main object signal and the sub-object signal are not always output. Thus, while the sensing in a plurality of directions is being performed, a high load can be avoided from being placed on the set side (set controller 40), and a high-accurate arithmetic operation system, a high-speed arithmetic operation, a high-speed process, and low power consumption can be realized.

Particularly in an automobile (a transportation device) application, in recent years, set controller 40 (an integrated circuit) is highly integrated (as one example, the number of general-purpose processors (CPUs) is increased) in order to make a lot of controls. In such a case, the power consumption and the cost are increased in the entire set, namely, the load becomes extremely large, resulting in an arithmetic operation error or an arithmetic operation delay. However, this problem can be solved in the exemplary embodiment.

In the exemplary embodiment, sub-sensing system 10b may receive the reference signal from set controller 40, similarly to main sensing system 10a. In this case, sub-sensing system 10b can make a determination that is more suitable for the travelling environment.

The sensing system and the driving support system of the present invention are not limited to the above exemplary embodiments. The present invention includes other exemplary embodiments realized by any combination of components in the above exemplary embodiments, modified examples obtained by various modifications apparent to those skilled in the art upon the above exemplary embodiments without deviating from the gist of the present invention, and various devices provided with the sensing system and the driving support system according to the exemplary embodiments.

Since the sensing system and the driving support system of the present disclosure enables highly accurate sensing of a target, the systems are usefully mounted to, for example, transportation devices.

What is claimed is:

1. A driving support system comprising:
a sensing system including a light source for emitting infrared light according to a light emission signal, a solid-state imaging device, and an arithmetic operation unit; and
a set controller, wherein:
the solid-state imaging device outputs a visible light imaging signal and a time-of-flight signal, the time-of-flight signal including: a first imaging signal generated through exposure of reflected light corresponding to the infrared light according to a first exposure signal; a second imaging signal generated through exposure of reflected light corresponding to the infrared light according to a second exposure signal; and a third imaging signal generated through exposure in a state in which the light emission signal is stopped, wherein timing of the second exposure signal is different from timing of the first exposure signal, and the third imaging signal corresponds to background light,
the arithmetic operation unit:
detects a specific object in an object using the visible light imaging signal and the time-of-flight signal;
calculates a distance to the specific object based on a ratio of light quantities of the first imaging signal and the second imaging signal, from which a light quantity of the third imaging signal is subtracted, respectively; and
outputs, to the set controller, the distance and an object signal indicating information on the specific object that is calculated from: a reference signal indicating at least one of position information of a transportation device, on which the driving support system is mounted, motion information of the transportation device, or operation information of the transportation device, obtained by a sensor of the transportation device; the first imaging signal; and the second imaging signal,
the information on the specific object is calculated using the visible light imaging signal and the time-of-flight signal, and includes at least one of a kind of the specific object, a dimension of the specific object, a shape of the specific object, a speed of the specific object, and
the set controller controls driving of the transportation device using the distance and the object signal transmitted from the arithmetic operation unit.

2. The driving support system according to claim 1, wherein the sensing system performs sensing using at least one of reference signals representing position information of the transportation device, cloud information, and motion information or operation information of the transportation device, the reference signals being transmitted from the transportation device.

3. The driving support system according to claim 2, wherein the cloud information is at least one piece of information representing a map in a horizontal direction and/or a vertical direction, and successive environment of a travelling place or a scheduled travelling place.

4. The driving support system according to claim 1, wherein the arithmetic operation unit has an object arithmetic operation unit and a signal processor,
the object arithmetic operation unit obtains the specific object, calculates the plural pieces of information, and outputs the plural pieces of information as a primary object signal to a signal processor, and
the signal processor select a part or all of the plural pieces of information should be outputted, and outputs the part or all of the plurality of information as the object signal to the set controller.

5. The driving support system according to claim 1, wherein the arithmetic operation unit executes at least one signal process of a noise subtracting process, a super-resolution process, a high-dynamic range synthesizing process, and a compression process.

6. The driving support system according to claim 1, wherein
the arithmetic operation unit selects the visible light imaging signal or the time-of-flight signal, or corrects one of the visible light imaging signal and the time-of-flight signal using the other of the visible light imaging signal and the time-of-flight signal.

7. The driving support system according to claim 6, wherein a distance image is generated using the time-of-flight signal.

8. The driving support system according to claim 6, wherein the solid-state imaging device is a single-plate solid-state imaging device, and
the visible light imaging signal is generated from at least one pixel of R, G, B and BW, and the time-of-flight signal is generated from an IR pixel.

9. The driving support system according to claim 1, wherein the plural pieces of information includes one or more selected from the group consisting of recognition of the specific object, a distance up to the specific object, a dimension of the specific object, a shape of the specific object, and a speed of the specific object.

10. The driving support system according to claim 1, wherein the set controller executes at least one selected from the group consisting of an automatic brake operation, an emergency brake signal operation, an automatic steering operation and an automatic acceleration operation.

11. The driving support system according to claim 1, wherein the driving support system is used for a sensing application inside the transportation device.

12. The driving support system according to claim 11, wherein the specific object is a driver of the transportation device, and
the sensing application is a prevention of the driver's dozing or a prevention of inattentive driving.

13. The driving support system according to claim 1, wherein the solid-state imaging device outputs the time-of-flight signal by using an exposure signal supplied from outside the solid-state imaging device.

14. A driving support system comprising:
a sensing system including a light source for emitting infrared light according to a light emission signal, a solid-state imaging device, and an arithmetic operation unit; and
a set controller, wherein:
the solid-state imaging device outputs a light imaging signal and a time-of-flight signal, the time-of-flight signal including: a first imaging signal generated through exposure of reflected light corresponding to the infrared light according to a first exposure signal; a second imaging signal generated through exposure of reflected light corresponding to the infrared light according to a second exposure signal; and a third imaging signal generated through exposure in a state in which the light emission signal is stopped, wherein timing of the second exposure signal is different from timing of the first exposure signal, and the third imaging signal corresponds to background light, the arithmetic operation unit:
  detects a specific object in an object using the light imaging signal and the time-of-flight signal;
  calculates a distance to the specific object based on a ratio of light quantities of the first imaging signal and the second imaging signal, from which a light quantity of the third imaging signal is subtracted, respectively; and
  outputs, to the set controller, the distance and an object signal indicating information on the specific object that is calculated from: a reference signal indicating at least one of position information of a transportation device, on which the driving support system is mounted, motion information of the transportation device, or operation information of the transportation device obtained by a sensor of the transportation device; the first imaging signal; and the second imaging signal, the information on the specific object is calculated using the light imaging signal and the time-of-flight signal, and includes at least one of a kind of the specific object, a dimension of the specific object, a shape of the specific object, a speed of the specific object, and the set controller controls driving of the transportation device using the distance and the object signal transmitted from the arithmetic operation unit.

* * * * *